3,439,052
FLUOROFORM PRODUCTION
Geir Bjornson, Bartlesville, Okla., assignor to Phillips Petroleum Company, a corporation of Delaware
No Drawing. Filed Oct. 23, 1967, Ser. No. 677,055
Int. Cl. C07c 19/08
U.S. Cl. 260—653        5 Claims

ABSTRACT OF THE DISCLOSURE

Fluoroform is produced by the reaction of a chlorotrifluoromethane with hydrogen in a reaction zone substantially free of solid materials other than palladium, platinum, copper, silver, and gold.

BACKGROUND OF THE INVENTION

An early method of preparing fluoroform involved hydrogenolysis of perfluorocarbons. This process employed polycarbon starting compounds, and demonstrated that single carbon-containing fluorocarbon feeds were not converted to the desired product, i.e., fluoroform, Simmons, U.S. Patent No. 2,494,064. As disclosed in U.S. Patent No. 2,519,983, Simmons later discovered an electrochemical process involving electrolyzing a liquid HF solution containing a fluorinatable organic starting compound. However, this process was complicated by many by-products and involved corrosive and physiologically dangerous materials. More recently, Benning et al., U.S. Patent No. 2,615,926 disclosed a process involving a non-catalytic hydrogenolysis of chlorine-containing fluorocarbons which required as essential at least two chlorine atoms. This process was designed to operate on halopolyfluorocarbon feeds preferably having more than one carbon atom to convert the same to olefin derivatives thereof, and, as a result, was primarily concerned with halogen extraction and the concurrent extinction of extracted halogen by its reaction with hydrogen rather than the substitution of hydrogen for halogen.

Even more recently Olstowski and Watson disclosed in U.S. Patent No. 3,042,727 that halotrifluoromethanes wherein the halogen is chlorine, bromine, or iodine can be converted to fluoroform in the presence of hydrogen at temperatures of from 450° C. to about 900° C. (840–1550° F.) and at holding times from about 0.1 to 10 seconds and preferably from 0.5 to 1 second.

No preferences were established for the composition of materials contacting reactants in the reaction zone aside from the observation that copper catalysts can be employed although they are not essential. In fact, it was observed that such catalysts are actually undesirable at higher temperatures where Olstowski et al. observed that their presence promoted a higher degree of degradation of reactants to hydrogen fluoride.

I have found that these conversion levels result in the production of a reactant-product mixture which is separable only with considerable difficulty, e.g., by very low temperature fractionation. Due to physical characteristics of the reaction effluent components, considerably higher levels of conversion would greatly reduce the extent of low temperature fractionation required.

Fluoroform boils at −82.1° C. at 1 atmosphere pressure, while chlorotrifluoromethane boils at −81.3° C. with an azeotrope of two compounds boiling at −88.7° C. As a result fluoroform (as such) cannot be separated by ordinary distillation from a mixture comprising fluoroform and chlorotrifluoromethane unless an azeotropic amount of chlorotrifluoromethane has been distilled. The composition of this azeotrope requires that the ratio of fluoroform to chlorotrifluoromethane be greater than 0.79 before pure fluoroform can be separated from a mixture of the two compounds by ordinary fractional distillation. Thus the conversion of chlorotrifluoromethane to fluoroform must be greater than 44.1% in order to obtain pure fluoroform by fractional distillation. Obviously any process that does not provide conversions of at least that level would require considerably more extensive product purification facilities and would be subject to the consequent competitive disadvantages associated with higher investment and operating cost.

It is therefore one object of this invention to provide a method for the production of fluoroform. It is another object of this invention to reduce the extent of side reactions involved in the conversion of halotrifluoromethanes to fluoroform. It is yet another object of this invention to provide a method of converting halotrifluoromethane to fluoroform at greatly improved conversion levels. It is yet another object of this invention to provide a method for converting halotrifluoromethane to fluoroform wherein the reaction effluent composition is such that pure fluoroform can be easily obtained therefrom. It is yet another object of this invention to provide a method for producing pure fluoroform from halotrifluoromethane particularly from chlorotrifluoromethane. It is yet another object of this invention to provide a simplified method for producing pure fluoroform being substantially free of reactant materials.

SUMMARY

In accordance with one embodiment of this invention halotrifluoromethanes wherein the halogen in said halotrifluoromethane is one of chlorine, bromine, or iodine are converted to fluoroform by reaction with hydrogen in a reaction zone substantially free of materials other than palladium, platinum, copper, silver, and gold. The necessary amounts of hydrogen can be provided by either introducing elemental hydrogen into the reaction zone or by introducing a hydrogen-yielding compound which either decomposes at reaction conditions to yield hydrogen or which reacts with halotrifluoromethane to substitute hydrogen for the non-fluorine halogen of the halotrifluoromethane feed. However, where chlorotrifluoromethane is employed as preferred it is also preferred that the hydrogen be supplied by introducing elemental hydrogen to the reaction zone. It is also preferred that the reactor design be such that maximum heat exchange is effected with a minimum of contact between the reactor surface and reactant materials and products.

DESCRIPTION OF PREFERRED EMBODIMENTS

It is apparent from the prior art that the processes described do not provide the conversion levels required to produce an easily separable product. These shortcomings are attributed to the very short residence times and, relatively low operating temperatures, and the presence of materials in the reaction zone which promote side reactions and degradation of both reactants and products. It is observed that the relatively mild operating conditions preferred in the prior art, particularly the very short residence times, are necessary in those processes to avoid substantial conversion of reactants, intermediates, and products to undesirable by-products such as HF and carbon.

I have found that the extent of the difficulty associated with these side reactions is due to the physical nature and chemical make-up of the interior reactor surfaces employed in these processes which are clearly deleterious to the desired conversions. Such surfaces, particularly with high surface contact areas as taught the prior art, catalyze undesired side reactions that result in the production of methane, carbon, hydrogen fluoride and other undesirable materials particularly at longer residence times which, I have found, are necessary to effect the degree of conversion essential for efficient product purification for the reasons above described. Numerous other materials disclosed in the prior art as being preferred for the production of varieties of fluorocarbons were tested for their suitability in the conversion of chlorotrifluoromethane to fluoroform. Although some of these materials, e.g., highly polished nickel, were satisfactory for relatively short periods, i.e., two hours or less, it was obvious that conversion to fluoroform deteriorated rapidly, the reactors plugged with carbon, and the formation of carbon, methane and hydrogen fluoride was accelerated.

These results are illustrated in the examples.

Flow rates will, of course, vary depending upon reactor design, operating conditions, and the desired residence times, but are preferably such that residence times of about 15 seconds or more are achieved. In this regard, I have found that very short residence times, e.g., 0.1 seconds, are effective in accomplishing at least the partial conversion of halotrifluoromethane to fluoroform, but that such operations result in undesirably small conversion levels.

As a result, it is generally preferred that the residence times be within the range from about 15 seconds to about 5 minutes although under most circumstances the desired conversion levels can be achieved with contact times in the range of about 20 to about 60 seconds.

Tube type reactors having highly polished interior surfaces having minimum surface to volume ratios for the reactor volume required are preferred. It is also preferred that the reaction zone be free of protrusions from the side walls and be operated in the absence of any packing material. Obviously many reactor configurations can be employed. It is essential to the concept of this invention that the reactor surfaces in contact with reactants be comprised of material that is substantially nondeleterious to the desired conversions, i.e., materials that do not substantially catalyze side reactions, such as the conversion of the halotrifluoromethane and hydrogen to methane, hydrogen halide, hydrogen fluoride, or carbon. I have found that interior reactor surfaces composed of copper, palladium, silver, gold, or platinum are extremely effective.

In view of the fact that certain of these materials are relatively expensive, the economics of reactor construction will generally dictate the manner in which the reactor is constructed. For instance, a reactor of conventional tube-design can be conveniently fabricated of copper, and heated exterior surfaces of such a reactor that are exposed to oxygen of the atmosphere can be protected from oxidation by a suitable exterior oxygen impervious coating. For example, a copper tube can be shielded with nickel. On the other hand, a reactor can be fabricated of a material such as nickel, iron, or the like and can be lined or coated on the interior surfaces with one of the metals of the invention such as platinum, palladium, or gold. Variations and modifications of construction that will provide a reactor meeting the specifications above disclosed are within the spirit and scope of this invention.

Reaction temperatures can vary considerably. Temperatures within the range of about 800° to about 1500° F. are generally preferred. The ratio of hydrogen to halotrifluoromethane in the feed can also vary considerably although lower ratios of at least 1:1 are preferred due to the relative low cost of hydrogen and desirability of effecting maximum conversion of halotrifluoromethane to fluoroform. An excess of hydrogen is usually preferred. Hydrogen/halotrifluoromethane ratios in the feed can range up to 20/1 and higher, although ratios in excess of this factor do not provide any decisive advantage and are undesirable in that they require increased reactor volume for any given halotrifluoromethane throughput. The preferred reactant ratios, i.e., the ratios of hydrogen to halotrifluoromethane in the feed, are within the range of about 2:1 to about 5:1. The pressure in the reaction zone can also vary considerably and can be either subatmospheric or superatmospheric although atmospheric pressure is normally preferred for convenience. In addition any diluent that is substantially nondeleterious to the conversion of halotrichloromethane to fluoroform can be employed. Such diluents are, for example, helium, neon, nitrogen, etc.

In view of the fact that conversions to fluoroform required to exceed the fluoroform-halotrifluoromethane azeotrope limits, e.g., 44.1% fluoroform in the case of fluoroform-chlorotrifluoromethane mixtures, can be substantially exceeded by the process of this invention due to the conversions easily obtained, i.e., in excess of 80% as illustrated in Run #4 of Table 1, essentially pure fluoroform can be obtained by simple fractionation as is demonstrated in Example 7. This material can be employed, for example, as feed stock for the production of valuable unsaturated fluorocarbons by many known processes, for example, by the process disclosed in U.S. Patent 3,009,966. The unsaturated fluorocarbons are known to be useful in many applications particularly as precursors of halocarbon polymers such as polytetrafluoroethylene.

The following general method was employed to effect the runs of the examples. Feed streams comprised of chlorotrifluoromethane and hydrogen were charged to hot-tube reactors heated by an electrical furnace containing three 1,000-watt heaters. Temperature was automatically maintained at desired levels. Feed gases were metered through pressure controls and rotameters which had been calibrated with a wet test meter. Effluent from the reactors was passed through a dry trap, two water scrubbers, and drier prior to analysis with a gas chromatograph. The chromatographic equipment was appropriately calibrated with authentic samples of compounds of interest.

EXAMPLE I

The reactor in this example was a ½ inch copper tube (0.4 inch inside diameter) which was shielded from the atmosphere on the outside and heated over a 19-inch length within the furnace. The effluent stream was characterized by gas chromatography. Runs 1 and 2 of Table I, which follows, present data for this example.

EXAMPLE II

The reactor in this example was a double-stage copper tube fabricated from two ½ inch copper tubes exteriorly shielded and heated over 19 inches each by an electrical furnace. HCL was scrubbed from the effluent of the first stage before passing that effluent to the second stage. Effluent from the second stage was analyzed by gas chromatography as before. Data for this example follow in Table I, as runs 3 and 4.

TABLE I

| Run No. | 1 | 2 | 3 | 4 |
|---|---|---|---|---|
| Reactor Temperature, °F | 1,288 | 1,323 | 1,207 | 1,265 |
| Mole Ratio, $CClF_3/H_2$ | 0.5 | 0.5 | 0.5 | 0.5 |
| Space velocity, hours⁻¹ (in each tube) | 75 | 150 | 75 | 75 |
| Residence Time, sec | 48 | 24 | 48 | 48 |
| Analysis, Approximate Mole Percent: | | | | |
| $CHF_3$ | 73.54 | 79.30 | 61.18 | 86.60 |
| $CClF_3$ | 23.32 | 14.07 | 38.08 | 8.94 |
| $CF_2=CF_2$ | 0.0 | 0.72 | 0.0 | 0.07 |
| $CHF_2-CHF_2$ | 1.79 | 2.26 | 0.51 | 1.35 |
| $CH_2F-CF_3$ | 0.74 | 0.59 | 0.0 | 1.99 |
| $CHF_2-CF_3$ | 0.46 | 1.43 | 0.15 | 0.75 |
| $CH_2F-CH_2F$ | 0.04 | 0.12 | 0.0 | 0.0 |
| $CH_3-CF_3$ | 0.0 | 0.62 | 0.0 | 0.08 |
| $CH_4$ | 0.04 | 0.57 | 0.03 | 0.13 |
| Other | 0.05 | 0.32 | 0.05 | 0.09 |
| Per pass conversion, percent of $CClF_3$ to $CHF_3$ | 73.54 | 79.30 | 61.18 | 86.60 |
| Selectivity, percent | 93 | 87 | 98 | 91 |

The above runs of Example I and Example II demonstrate that high conversions and ultimate yields (selectivities) of fluoroform are obtained by the process of this invention.

EXAMPLE III

A ½ inch copper tube was plated with palladium on the interior surfaces by letting a solution of palladium chloride (30 vol. percent conc. HCL, 70 vol. percent $H_2O$, saturated with palladium chloride) stand in the tube for 7 minutes. A smooth bright surface was produced. This plated tube (0.4 inch inside diameter) was then heated over 19 inches of its length in the funace and employed as a reactor as in Example I. Run 5 of Table II presents the data of this run.

EXAMPLE IV

The feed was first charged to a ½ inch copper tube heated over 19 inch. The effluent from this first stage was scrubbed to remove HCL, and passed to a palladium plated copper tube reactor (as used in Example III). The effluent of the second reactor was analyzed as previously described. Run 6 of Table II, below, presents the data of this run.

Runs 5 and 6 demonstrate that reactors with palladium interior surfaces also give good conversion and produce but little carbon or methane.

In all of the runs (1–6) it was observed that the reactors did not plug with carbon or collect carbon deposits on the inside, even after many hours of operation. In fact, in all cases, the interior surfaces of the reactors remained bright and free of deposits or corrosion. For example, after runs of as much as 60 hours, the longest effected, the copper reactor surfaces remained bright and free of deposits or corrosion.

EXAMPLE V

In this example a nickel tube was employed as the reactor. In less than 6 hours coke was noted to form and large amounts of methane were produced. Run 7, in Table II below, is typical of the results obtained after only 6 hours of operation of a new polished nickel tube reactor. It was noted that conversion was poor and that considerable methane was formed. Production of carbon and hydrogen halides accounted for further loss of reactants. The coke was removed mechanically and by air oxidation followed by hydrogen reduction after a 6 hour run. However, the interior surface of the reactor was noted to be no longer bright. The action of the reaction environment on the interior nickel surface was not reversible by ordinary means. When runs were made with a reactor with a regenerated nickel surface considerable coke and methane formation were immediately evident.

TABLE II

| | Run No. | | |
|---|---|---|---|
| | 5 | 6 | 7 |
| | Reactor type | | |
| | Pd lined tube | Cu tube, then Pd lined tube | Ni tube |
| Temperature, °F | 1,268 | 1,247 | 1,050 |
| Mole Ratio, $CClF_3/H_2$ | 0.5 | 0.5 | 0.5 |
| Space Velocity, hours$^{-1}$ | 75 | 75 | 75 |
| Residence Time, sec | 48 | 48 | 48 |
| Analysis of Effluent, Approximate Mole Percent: | | | |
| $CHF_3$ | 71.24 | 77.80 | 30.57 |
| $CClF_3$ | 26.95 | 19.59 | 48.84 |
| $CF_2=CF_2$ | | 0.02 | |
| $CHF_2-CHF_2$ | 1.36 | 1.10 | 0.15 |
| $CHF_2-CF_3$ | 0.15 | 0.85 | |
| $CHF_2-CF_3$ | 0.20 | 0.52 | 1.01 |
| $CH_3-CF_3$ | | 0.04 | 0.32 |
| $CH_4$ | 0.06 | 0.03 | 16.73 |
| Other | 0.04 | 0.05 | 2.38 |
| Per pass Conversion of $CClF_3$ to $CHF_3$ | 71.24 | 77.80 | 30.57 |
| Selectivity | 95 | 95 | 59 |

EXAMPLE VI

The effectiveness of several prior art processes was investigated by a series of control runs the results of which are illustrated in Table III.

TABLE III

| | Run No. | | | | | | |
|---|---|---|---|---|---|---|---|
| | 8 | 9 | 10 | 11 | 12 | 13 | 14 |
| | Reactor Type | | | | | | |
| | Monel Tube (¼ in.) | Inconel Tube (⅜ in.) | Copper Tube (⅜ in.) | Copper Tube (⅝ in.) | Inconel Tube (⅜ in.) | Inconel Tube (⅜ in.) | Nickel Tube (½ in.) |
| Packing in Reactor | None | None | (¹) | (²) | (³) | (⁴) | (⁵) |
| Temperature, °F | 1,100 | 1,011 | 1,100 | 1,100 | 800 | 850 | 1,250 |
| Residence Time, sec | 12.7 | 22.6 | 28.8 | 58.1 | 20.3 | 34.6 | 15.8 |
| Space Rate, Hour$^{-1}$ | 283 | 159 | 125 | 62 | 177 | 104 | 228 |
| $CClF_3/H_2$ (Mole Ratio) | 0.5 | 0.5 | 0.5 | 0.5 | 0.34 | 1.0 | 0.1 |
| $CHF_3$ (conv.) | 39.8 | 51.2 | 31.0 | 7.7 | 4.4 | 15.9 | 69.0 |
| $CClF_3$ | 32.4 | 34.3 | 58.0 | 90.8 | 0.6 | 74.4 | 0.4 |
| Selectivity, percent | 59 | 78 | 74 | 84 | 4 | 63 | 69 |
| Other | 5.3 | 0.8 | 0.5 | 0.2 | 11.4 | 6.1 | 1.2 |
| $CH_4$ | 22.5 | 13.7 | 10.5 | 1.3 | 83.6 | 3.6 | 29.4 |
| Coke Formed | Yes | Yes | No | Yes | Yes | Yes | Yes |
| Remarks | (⁶) | (⁷) | (⁸) | (⁹) | (¹⁰) | (¹⁰) | (¹⁰) |

¹ Zn-Cu Alloy, ⅛ in. pellets.
² Fe brads.
³ Ni, Ca phosphate with chromia.
⁴ Cu chromate on $AlF_3$.
⁵ $Cu_2Cl_2$ on $AlF_3$.
⁶ Reactor plugged solid with carbon before 4 hours.
⁷ Reactor nearly plugged with carbon before 4 hours.
⁸ Reactor plugged with $ZnCl_2$ by 12 hours.
⁹ Reactor plugged with $FeF_3$ by 12 hours.
¹⁰ Tube partially plugged with coke by 3.75 hours and activity off.

These results demonstrate that prior art methods of fluoroform synthesis do not provide satisfactory conversion. Relatively poor conversion, poor selectivity, reactor plugging, methane production, and combinations of such problems are noted in every instance.

EXAMPLE VII

The hydrogen stripped product effluent from a double copper tube reactor, as exemplified by Runs 3 and 4 of Example II above, was fractionated in a low temperature fractional distillation column. An azeotrope fraction (−88.7° C.) and a fluoroform rich fraction (−82.1° C.) were separated (1 atm. pressure). The compositions of these fractions as determined by chromatographic analysis are illustrated below.

TABLE IV

| Compound Area, percent (Approx. Mole percent) | Azeotrope Fraction | Fluoroform Fraction |
|---|---|---|
| $CHF_3$ | 44.08 | 99.88 |
| $CClF_3$ | 55.91 | 0.12 |
| $CF_1=CF_2$ | 0.01 | 0.00 |

The above example clearly demonstrates that substantially pure fluoroform can be separated from the product effluent by fractional distillation. It also demonstrates that the $CHF_3/CClF_3$ ratio (by approximate mole percents) must be greater than 0.79 to obtain fluoroform of greater than 44.1% purity by ordinary fractional distillation, and further demonstrates that ultimate conversion of $CClF_3$ to $CHF_3$ must be greater than 44.1% to obtain a mixture comprised of more than 44.1% fluoroform by ordinary fractional distillation. The azeotrope can be recycled to the reactor. Other means of separation can also be employed within the scope of this invention.

I claim:

1. A method for producing fluoroform which comprises contacting at least one halotrifluoromethane and hydrogen, wherein the halo constituent of said halotrifluoromethane is one of chlorine, bromine, and iodine, at a temperature within the range of from about 800 to about 1500° F. in the absence of any packing material and in a reaction zone having interior surfaces free of protrusions and consisting essentially of at least one metal selected from palladium, platinum, copper, silver, and gold.

2. The method of claim 1 wherein said halotrifluoromethane is chlorotrifluoromethane.

3. The method of claim 1 wherein the ratio of said hydrogen to said halotrifluoromethane is within the range of 1:1 to about 20:1.

4. The method of claim 1 wherein the contact time of said halotrifluoromethane and hydrogen at said temperature is in excess of 15 seconds.

5. The method of claim 1 wherein said contact time at said temperature is within the range of from about 20 to about 60 seconds.

References Cited

UNITED STATES PATENTS

| | | | |
|---|---|---|---|
| 2,992,280 | 7/1961 | Olstowski et al. | 260—653 |
| 3,042,727 | 7/1962 | Olstowski et al. | 260—653 |

DANIEL D. HORWITZ, *Primary Examiner.*